United States Patent
Salandre et al.

(10) Patent No.: US 10,569,733 B2
(45) Date of Patent: Feb. 25, 2020

(54) INTERIOR PANEL INCLUDING A COVER SKIN WITH A TEAR SEAM FOR A MOTOR VEHICLE AND A METHOD FOR MAKING THE SAME

(71) Applicant: FAURECIA INTERIOR SYSTEMS, INC., Auburn Hills, MI (US)

(72) Inventors: Maxime Salandre, Auburn Hills, MI (US); Brett Schnur, Auburn Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 32 days.

(21) Appl. No.: 15/986,296

(22) Filed: May 22, 2018

(65) Prior Publication Data

US 2019/0359164 A1 Nov. 28, 2019

(51) Int. Cl.
*B32B 3/30* (2006.01)
*B60R 21/2165* (2011.01)
*B32B 27/32* (2006.01)
*B32B 27/08* (2006.01)
*B32B 27/36* (2006.01)
*B32B 9/02* (2006.01)
*B32B 27/30* (2006.01)

(52) U.S. Cl.
CPC ............ *B60R 21/2165* (2013.01); *B32B 3/30* (2013.01); *B32B 9/025* (2013.01); *B32B 27/08* (2013.01); *B32B 27/304* (2013.01); *B32B 27/32* (2013.01); *B32B 27/325* (2013.01); *B32B 27/365* (2013.01); *B32B 2250/24* (2013.01); *B32B 2605/003* (2013.01); *Y10T 428/15* (2015.01)

(58) Field of Classification Search
CPC .......................... Y10T 428/15; B60R 21/2165
See application file for complete search history.

(56) References Cited

U.S. PATENT DOCUMENTS

| 6,224,090 B1 * | 5/2001 | Lutze ................. B60R 21/2165 280/728.3 |
| 7,497,463 B2 | 3/2009 | Kaulbersch et al. |
| 8,517,416 B2 | 8/2013 | Lesnik |
| 8,651,514 B2 | 2/2014 | Zhang |
| 2009/0243264 A1 * | 10/2009 | Kaulbersch ........... B29C 59/007 280/728.3 |
| 2013/0255003 A1 | 10/2013 | Forgacs et al. |
| 2016/0097109 A1 | 4/2016 | Forgacs et al. |
| 2016/0348078 A1 | 12/2016 | Forgacs et al. |
| 2017/0015268 A1 * | 1/2017 | Dorn ................... B60R 21/2165 |

FOREIGN PATENT DOCUMENTS

EP 2043811 B1 8/2013

\* cited by examiner

*Primary Examiner* — Alexander S Thomas
(74) *Attorney, Agent, or Firm* — LKGlobal | Lorenz & Kopf, LLP

(57) ABSTRACT

Interior panels for motor vehicles and methods for making such interior panels are provided. In one example, an interior panel includes a substrate and a cover skin that overlies the substrate. The cover skin has a tear seam configured as a double wave pattern including a first score line wave pattern and a second score line wave pattern that are substantially in phase. The first and second score line wave patterns each have an amplitude of from about 1.3 to about 1.7 mm and a period of from about 8 to about 10 mm.

14 Claims, 5 Drawing Sheets

INTERIOR PANEL INCLUDING A COVER SKIN WITH A TEAR SEAM FOR A MOTOR VEHICLE AND A METHOD FOR MAKING THE SAME

TECHNICAL FIELD

The technical field relates generally to interior panels for motor vehicles, and more particularly to interior panels that include a cover skin with a tear seam for motor vehicles, for example, for deployment of an airbag through the interior panel, and methods for making such interior panels.

BACKGROUND

Motor vehicles often include an inflatable restraint apparatus having an airbag device with a deployable airbag positioned in or behind an interior vehicle panel, such as an instrument panel, a door panel, a seat, or the like. Many interior panels include an integrated airbag door formed into the interior panel that is designed to break free upon deployment of the airbag. Often an area of the interior panel surrounding the integrated airbag door is scored or pre-weakened to form a tear seam that facilitates a clean airbag deployment, e.g., airbag deployment with minimal or no fragmentation of the interior panel.

To meet high customer expectations for quality and aesthetics, many interior panels are wrapped or otherwise decorated with a cover skin, such as leather, imitation leather, a polyvinyl chloride (PVC) skin, or the like, to improve the appearance and feel of the motor vehicle interior. Many cover skin materials, however, are relatively flexible and/or otherwise sensitive such that scoring or pre-weakening even just the back side (non-visible side) of the cover skin typically results in at least a portion of the tear seam being visibly apparent to the occupant(s) of the motor vehicle. This condition is commonly referred to as tear seam or score line "readthrough," which is aesthetically undesirable.

In one example disclosed in U.S. Pat. No. 7,497,463, issued to Kaulbersch et al., a lining of an interior vehicle panel for a cover of an airbag is provided. The lining material contains dash-like punctures in a region of its inner side adapted to face a periphery of a hinged airbag cover. The dash-like punctures form a weakening geometry or tear seam to facilitate a clean airbag deployment. The dash-like punctures are formed completely through the lining material from the inner side to the outer or visible side of the lining. As such, the tear seam is unfortunately fully visible to the occupants of the motor vehicle.

Accordingly, it is desirable to provide interior panels for motor vehicles including a cover skin that has a tear seam that tears or otherwise ruptures, for example, to facilitate a clean airbag deployment, and that is substantially or completely invisible to an occupant(s) of the motor vehicle, and methods for making such interior panels. Furthermore, other desirable features and characteristics of the present invention will become apparent from the subsequent detailed description and the appended claims, taken in conjunction with the accompanying drawings and this background.

BRIEF SUMMARY

Interior panels for motor vehicles and methods for making such interior panels are provided herein. In accordance with an exemplary embodiment, an interior panel for a motor vehicle includes, but is not limited to, a substrate and a cover skin that overlies the substrate. The cover skin has a tear seam configured as a double wave pattern including a first score line wave pattern and a second score line wave pattern that are substantially in phase. The first and second score line wave patterns each have an amplitude of from about 1.3 to about 1.7 mm and a period of from about 8 to about 10 mm.

In accordance with another exemplary embodiment, a method of making an interior panel for a motor vehicle is provided. The method includes forming a tear seam in a cover skin. They seem includes a double wave pattern that pre-weakens the cover skin. The double wave pattern includes a first score line wave pattern and a second score line wave pattern that are substantially in phase. The first and second score line wave patterns each have an amplitude of from about 1.3 to about 1.7 mm and a period of from about 8 to about 10 mm. The cover skin is arranged overlying a substrate.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
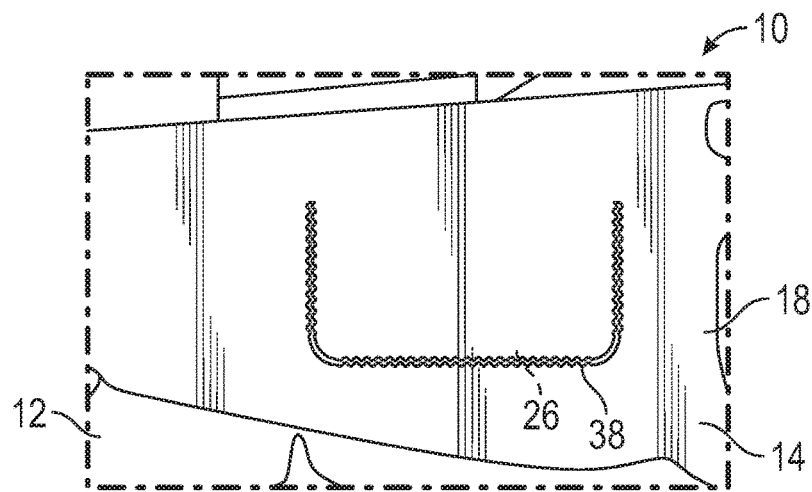
FIG. 1 illustrates a top view of an interior panel including a cover skin with a tear seam in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to interior panels for motor vehicles, and methods for making interior panels. The exemplary embodiments taught herein provide an interior panel for a motor vehicle including a substrate and a cover skin that overlies the substrate. The cover skin has a tear seam configured as a double wave pattern including a first score line wave pattern and a second score line wave pattern that are relatively closely spaced apart and substantially in phase. The first and second score line wave patterns each have an amplitude of from about 1.3 to about 1.7 mm and a period of from about 8 to about 10 mm.

In an exemplary embodiment, it has been surprisingly found that configuring the tear seam as a double wave pattern with the first and second score line wave patterns in phase with the foregoing indicated amplitude and period, readthrough of the tear seam is virtually or fully eliminated. Without being limited by theory, it is believed that the double wave pattern weakens a relatively broader area of the cover skin that more gradually transitions to the adjacent areas of the cover skin to be less visibly apparent to motor vehicle occupants than traditional tear seams, which are typically concentrated along a single score line that abruptly transitions to the adjacent areas of the cover skin, thereby creating readthrough of the score line. Further, it has been found that advantageously the double wave pattern tear seam effectively tears or otherwise ruptures, for example, during a deployment event to provide a clean airbag deployment. In particular, during a deployment event, the tear seam progressively tears along the weakest points along either and/or between portions of the first and second score line wave patterns to facilitate rupturing of the tear seam.

In an additional advantage of the interior panel disclosed herein is that, in some embodiments, the first and second score line wave patterns are spaced apart from each other a distance of from about 2.3 to about 2.7 mm. In an exemplary embodiment, by spacing the first and second score line wave patterns apart this distance, the tear seam is substantially or fully invisible to the motor vehicle occupants while effectively tearing or otherwise rupturing as intended.

An additional advantage of the interior panel disclosed herein is that, in some embodiments, the first and second score line wave patterns are configured as substantially in phase sine wave patterns. In an exemplary embodiment, configuring the first and second score line wave patterns as substantially in phase sine wave patterns, the tear seam is substantially or fully invisible to the motor vehicle occupants while effectively tearing or otherwise rupturing as intended.

In an additional advantage of the interior panel disclosed herein is that, in some embodiments, the amplitude of each of the first score line wave pattern and the second score line wave pattern is about 1.5 mm. In an exemplary embodiment, the amplitude of about 1.5 mm helps the tear seam to be substantially or fully invisible to the motor vehicle occupants while effectively tearing or otherwise rupturing as intended.

An additional advantage of the interior panel disclosed herein is that, in some embodiments, the period of each of the first score line wave pattern and the second score line wave pattern is about 9 mm. In an exemplary embodiment, a period of about 9 mm helps the tear seam to be substantially or fully invisible to the motor vehicle occupants while effectively tearing or otherwise rupturing as intended.

In an additional advantage of the interior panel disclosed herein is that, in some embodiments, the cover skin has an inner surface facing towards the substrate and an outer surface opposite the inner surface for facing an interior of the motor vehicle, and the first and second score line wave patterns are formed through the inner surface extending towards the outer surface of the cover skin. In an exemplary embodiment, forming the first and second score line wave patterns in the inner surface helps keep the tear seam to be substantially or fully invisible to the motor vehicle occupants.

An additional advantage of the interior panel disclosed herein is that, in some embodiments, the first score line wave pattern is defined by successively arranged and spaced apart first holes formed through the inner surface extending towards the outer surface of the cover skin, and the second score line wave pattern is defined by successively arranged and spaced apart second holes formed through the inner surface extending towards the outer surface of the cover skin. In an exemplary embodiment, the successively arranged and spaced apart first and second holes can be formed efficiently and at a relatively low cost and further, help the tear seam to be substantially or fully invisible to the motor vehicle occupants while effectively tearing or otherwise rupturing as intended.

In an additional advantage of the interior panel disclosed herein is that, in some embodiments, the first holes and/or the second holes have a pitch defined by a distance between centers of adjacent holes of from about 0.35 to about 0.45 mm. In an exemplary embodiment, the indicated period(s) of the successively arranged and spaced apart first and/or second holes can be formed efficiently and at a relatively low cost and further, help the tear seam to be substantially or fully invisible to the motor vehicle occupants while effectively tearing or otherwise rupturing as intended.

An additional advantage of the interior panel disclosed herein is that, in some embodiments, the first and second score line wave patterns are defined by negative features extending through the inner surface towards the outer surface with a remaining wall thickness (rwt) of the cover skin of from about 0.18 to about 0.32 mm. In an exemplary embodiment, by having the negative features extending through the inner surface towards the outer surface with the cover skin having the indicated rwt along the first and second score line wave patterns, the tear seam is substantially or fully invisible to the motor vehicle occupants while effectively tearing or otherwise rupturing as intended.

In an additional advantage of the interior panel disclosed herein is that, in some embodiments, the cover skin includes leather, imitation leather, or artificially grown leather. In an exemplary embodiment, overlying the substrate with leather, imitation leather, or artificially grown leather helps improve the appearance and feel of the interior panel for perceived quality and aesthetics.

An additional advantage of the interior panel disclosed herein is that, in some embodiments, the interior panel further includes an intermediate layer of a foam material or a self-tearing spacer fabric disposed between the substrate and the cover skin. In an exemplary embodiment, the intermediate layer helps improve the appearance and feel of the interior panel for perceived quality and aesthetics.

In an additional advantage of the interior panel disclosed herein is that, in some embodiments, a method for making the interior panel includes forming a tear seam in a cover skin. The tear seam includes a double wave pattern that pre-weakens the cover skin. The double wave pattern includes a first score line wave pattern and a second score line wave pattern that are substantially in phase and each having an amplitude of from about 1.3 to about 1.7 mm and a period of from about 8 to about 10 mm. The cover skin is arranged overlying a substrate. In an exemplary embodiment, by making the tear seam as a double wave pattern with the first and second score line wave patterns in phase with the foregoing indicated amplitude and period, readthrough of the tear seam is virtually or fully eliminated and further, the double wave pattern tear seam effectively tears or otherwise ruptures, for example, during a deployment event to provide a clean airbag deployment.

An additional advantage of the interior panel disclosed herein is that, in some embodiments, the tear seam is formed by a laser scoring process, a milling process, a perforation process, or an artificially grown leather process to define the first and second score line wave patterns. In an exemplary embodiment, by forming the tear seam as indicated, the cover skin can be efficiently manufactured with the tear seam at relatively low cost.

In an additional advantage of the interior panel disclosed herein is that, in some embodiments, the cover skin includes leather, imitation leather, or artificially grown leather, and the method for making the interior panel includes tanning the cover skin after forming the tear seam in the cover skin. In an exemplary embodiment, tanning the cover skin after forming the tear seam improves manufacturing flexibility for producing the interior panel.

Figure 2:
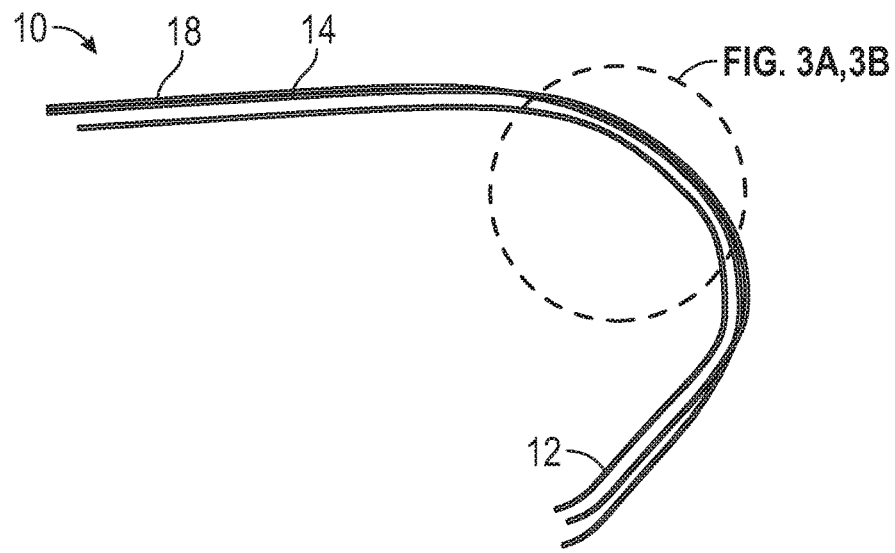
FIG. 2 illustrates a sectional view of an interior panel in accordance with an exemplary embodiment.

FIGS. 1-2 illustrate a top view and a sectional view, respectively, of an interior panel 10 for a motor vehicle in accordance with an exemplary embodiment. As illustrated, the interior panel 10 is an instrument panel that can be positioned forward of a driver seat and a front passenger seat in an interior of the motor vehicle. Alternatively, the interior panel 10 can be a door panel or other interior vehicle trim panel.

The interior panel 10 includes a substrate 12 and a cover skin 14 that overlies the substrate 12. The substrate 12 may be formed of a relatively rigid plastic material, such as, for example, styrene maleic anhydride (SMA), polycarbonate (PC), ABS, PC/ABS, polypropylene (PP), or any other substrate material for vehicle interior applications known to those skilled in the art.

Figure 3A:
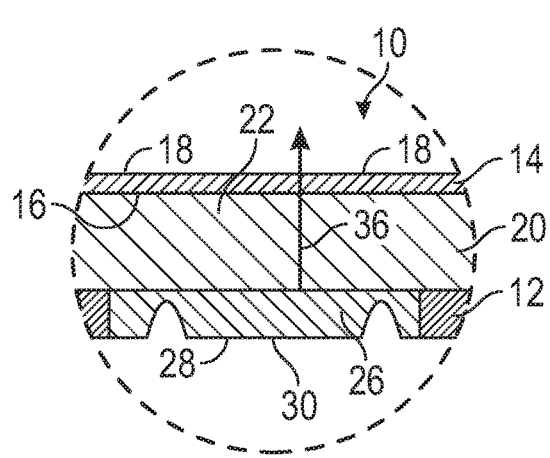
FIG. 3A illustrates a sectional view of the interior panel depicted in FIG. 2 in an area surrounded by circle 3 in accordance with an exemplary embodiment.

Referring also to FIG. 3A, the cover skin 14 has an inner surface 16 facing towards the substrate 12 and an outer surface 18 opposite the inner surface 16. In an exemplary embodiment, the outer surface 18 of the cover skin 14 is a Class A surface (e.g., visible or exposed surface) that faces a vehicle interior and is visible to a vehicle occupant(s) when arranged in a motor vehicle. The cover skin 14 may be formed of a relatively flexible material, such as, for example, leather or a leather-like skin product, a polyvinyl chloride (PVC) skin, a thermoplastic olefin (TPO) skin, or the like. In an exemplary embodiment, the cover skin 14 is formed of leather, imitation leather, or artificially grown leather. Examples of artificially grown leather are described in U.S. Patent Application Publication No. 2013/0255003, filed Mar. 28, 2013, U.S. Patent Application Publication No. 2016/0097109, filed Dec. 11, 2015, and U.S. Patent Application Publication No. 2016/0348078, filed Aug. 10, 2016, which are hereby incorporated by reference in their entirety for all purposes.

Figure 3B:
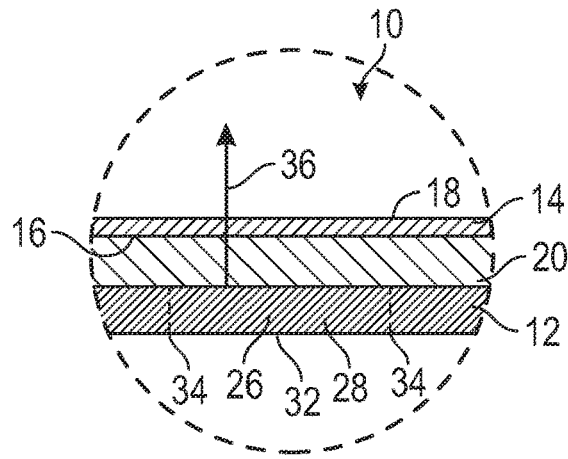
FIG. 3B illustrates a sectional view of the interior panel depicted in FIG. 2 in an area surrounded by circle 3 in accordance with another exemplary embodiment.

In an exemplary embodiment, the interior panel 10 includes an intermediate layer 20 that is disposed between the substrate 12 and the cover skin 14. The intermediate layer 20 may be formed of a relatively compliant or "cushion-like" material to provide padding for a softer finish to the interior panel 10. In an exemplary embodiment, the intermediate layer 20 is a layer of foam material 22. In an alternative embodiment and also with reference to FIG. 3B, the intermediate layer 20 is formed of a self-tearing spacer fabric 24.

In an exemplary embodiment, the interior panel 10 includes an integrated airbag door 26 that includes a door flap portion 28. The integrated airbag door 26 may be part of an airbag chute-door assembly 30 that is operatively coupled to the substrate 12 as illustrated in FIG. 3A, or alternatively, may be flap portion 32 of the substrate 12 that has been pre-weakened and defined by a score line 34 as are well known in the art. The integrated airbag door 26 is pivotably coupled to the substrate 12 such that the door flap portion 28 opens in a pivoting, parting manner (in a direction indicated by single headed arrow 36) to permit an airbag (not shown) to unfold and inflate outside of the interior panel 10 into the interior of the motor vehicle.

Figure 4:
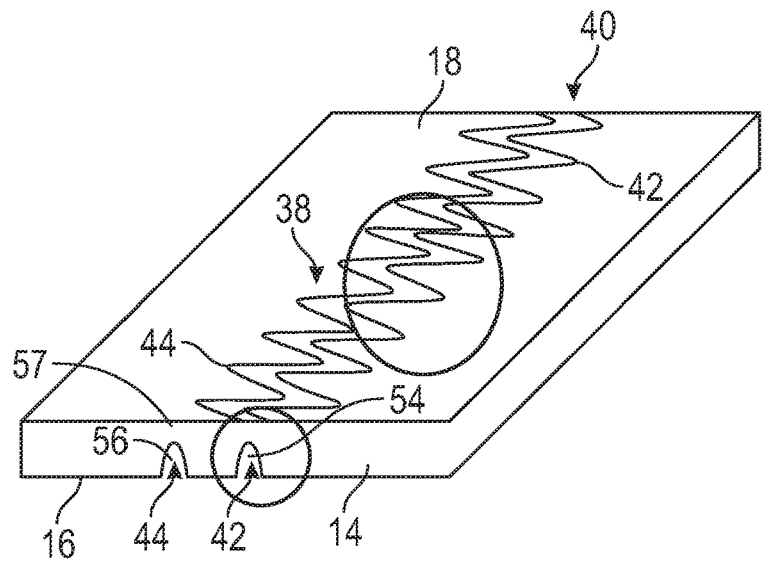
FIG. 4 illustrates a perspective view of a cover skin with a tear seam in accordance with an exemplary embodiment.

Referring to FIGS. 1 and 4, in an exemplary embodiment, to facilitate the opening of the integrated airbag door 26, the cover skin 14 is pre-weakened to define a tear seam 38. Although the tear seam 38 is shown in FIGS. 1 and 4 as being visible along the outer surface 18 of the cover skin 14, it is understood that this is for illustrative purposes only and that the tear seam 38 is substantially or fully invisible to a vehicle occupant who is viewing the outer surface 18 of the interior panel 10 from the interior of the motor vehicle.

Figure 5:
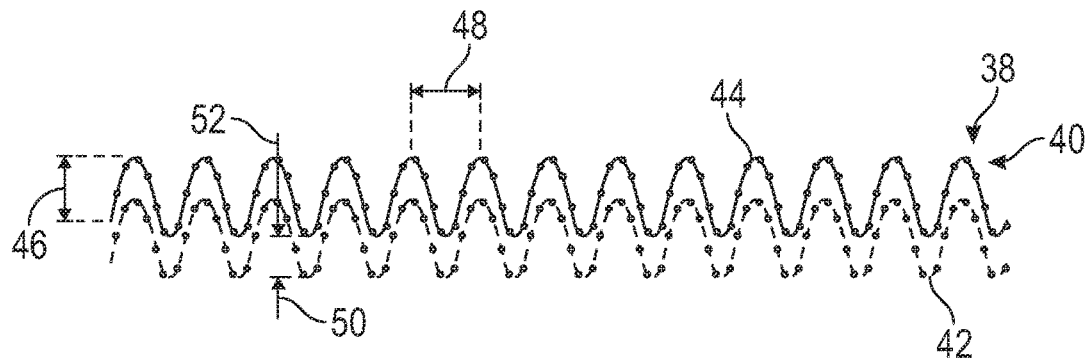
FIG. 5 illustrates a tear seam in accordance with an exemplary embodiment.

Referring also to FIG. 5, the tear seam 38 is configured as a double wave pattern 40 including a first score line wave pattern 42 and a second score line wave pattern 44 that are substantially in phase. In an exemplary embodiment, the first and second score line wave patterns 42 and 44 are configured as substantially in phase sine wave patterns. In an exemplary embodiment, the first and second score line wave patterns 42 and 44 each have an amplitude (indicated by double headed arrow 46) of from about 1.3 to about 1.7 mm, for example about 1.5 mm, and a period (indicated by double headed arrow 48) of from about 8 to about 10 mm, for example about 9 mm. In an exemplary embodiment, the first and second score line wave patterns 42 and 44 are spaced apart from each other a distance (indicated by arrows 50 and 52) of from about 2.3 to about 2.7 mm, for example about 2.5 mm.

As illustrated in FIG. 4 the first and second score line wave patterns 42 and 44 are negative features 54 and 56 formed through the inner surface 16 extending towards the outer surface 18 of the cover skin 14. In an exemplary embodiment, the cover skin 14 has a thickness of from about 0.5 to about 1.5 mm, for example about 0.8 mm and the negative features 54 and 56 are formed partially through the cover skin 14 such that the cover skin 14 has a remaining wall thickness (rwt) 57 of from about 0.18 to about 0.32 mm, for example about 0.25 mm, directly overlying the negative features 54 and 56.

Figure 6:
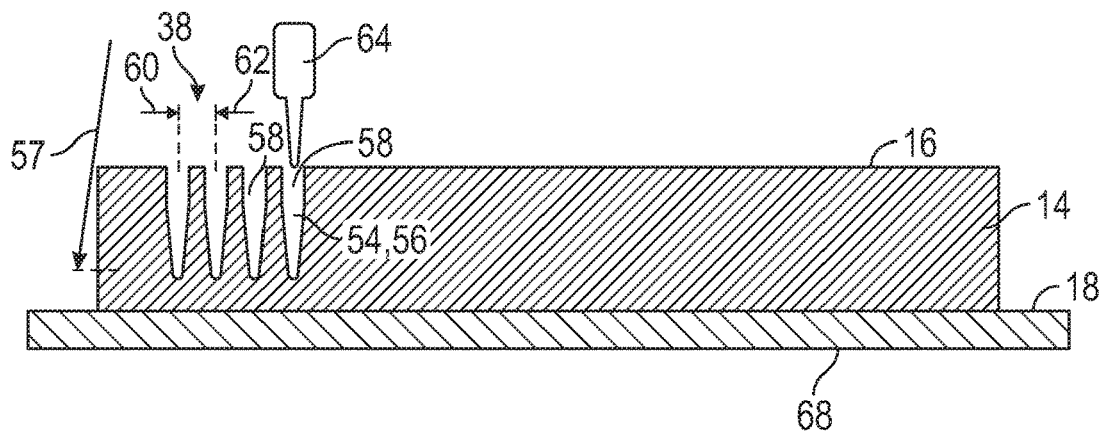
FIG. 6 illustrates a sectional view of a cover skin with a tear seam in accordance with an exemplary embodiment.

The negative features 54 and 56 can independently be a continuous groove or channel, for example formed by a milling process or an artificially grown leather process, a series of holes, for example formed by a laser scoring process, an artificially grown leather process, or a perforation process, and/or any other pre-weakening feature that reduces the wall stock of the cover skin 14. Referring also to FIG. 6, in an exemplary embodiment, the tear seam 38 including the first and second score line wave patterns 42 and 44 are defined by successively arranged and spaced apart holes 58 formed through the inner surface 16 extending towards the outer surface 18 of the cover skin 14. In an exemplary embodiment, the holes 58 have a pitch defined by a distance (indicated by arrows 60 and 62) between centers of adjacent holes 58 of from about 0.35 to about 0.45 mm, for example about 0.4 mm. In one example, the holes 58 are formed by supporting the outer surface 18 of the cover skin 14 on a table 68 while a needle 64 successively penetrates through spaced apart portions of the inner surface 16 and advances partially through the cover skin 14 towards the outer surface 18 to form the successively arranged and spaced apart holes 58 that define the first and second score line wave patterns 42 and 44.

Figure 12:
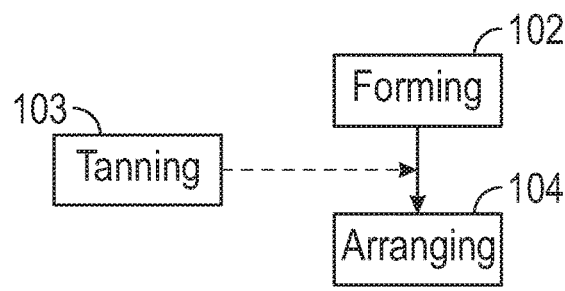
FIG. 12 is a flowchart of a method of making an interior panel for a motor vehicle in accordance with an exemplary embodiment.

Referring to FIG. 12 a method 100 of making an interior panel for a motor vehicle is provided. The method 100 includes forming (STEP 102) a tear seam in a cover skin. The tear seam includes a double wave pattern as discussed above to pre-weaken the cover skin. The cover skin is arranged (STEP 104) overlying a substrate. In an exemplary embodiment, the cover skin is formed of leather, imitation leather, or artificially grown leather and optionally, the cover skin is subjected to a tanning process as is well known in the art to tan the cover skin (STEP 103) after forming the tear seam in the cover skin.

EXAMPLES AND RESULTS OF DESIGN OF EXPERIMENTS (DOES)

The following are examples and results of DOEs conducted in accordance with various exemplary embodiments. The examples and results of the DOEs are provided for illustration purposes only and are not meant to limit the various embodiments of the interior panel in any way.

A series of DOEs were conducted to define pre-weakening parameters for a tear seam of a cover skin for an interior panel as discussed herein in which a summary of the results of the DOEs are provided in FIGS. 7-11. Leather plaques that had a thickness of 0.8 mm were used for all of the DOEs. The tear seam was formed using a perforation process with a 0.3 mm diameter needle to form sequentially arranged and spaced apart holes. Further, tensile strength was used to determine the amount of weakening in the cover skin in which lower tensile strengths would yield more tearing on the score line and faster opening times during airbag deployment.

Figure 7:
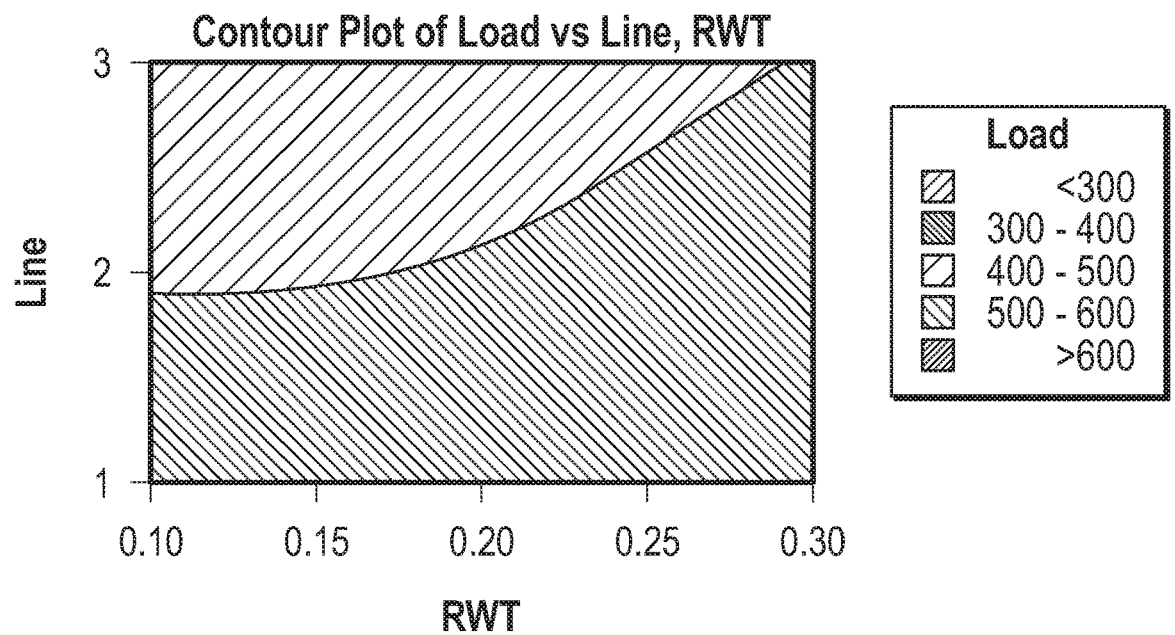
FIG. 7 illustrates a contour plot of tensile load versus number of score lines of a tear seam with respect to remaining wall thickness (rwt) of a cover skin in accordance with an exemplary embodiment.

FIG. 7 illustrates a contour plot of tensile load versus number of score lines of a tear seam with respect to remaining wall thickness (rwt) of a cover skin in accordance with an exemplary embodiment. Cover skin samples having tear seams with 1 or multiple score lines, e.g., 2 or 3 score lines, with varying remaining wall thickness from about 0.1 to about 0.3 mm, were prepared and tested to determine the tensile load required to tear the tear seams. The target tensile load was 450 N but up to 500 N was considered acceptable. Additionally, cover skins with score lines with higher rwt resulted in less visually apparent score lines. The results indicated that 2 score lines yielded the highest rwt for the target tensile load.

Figure 8:
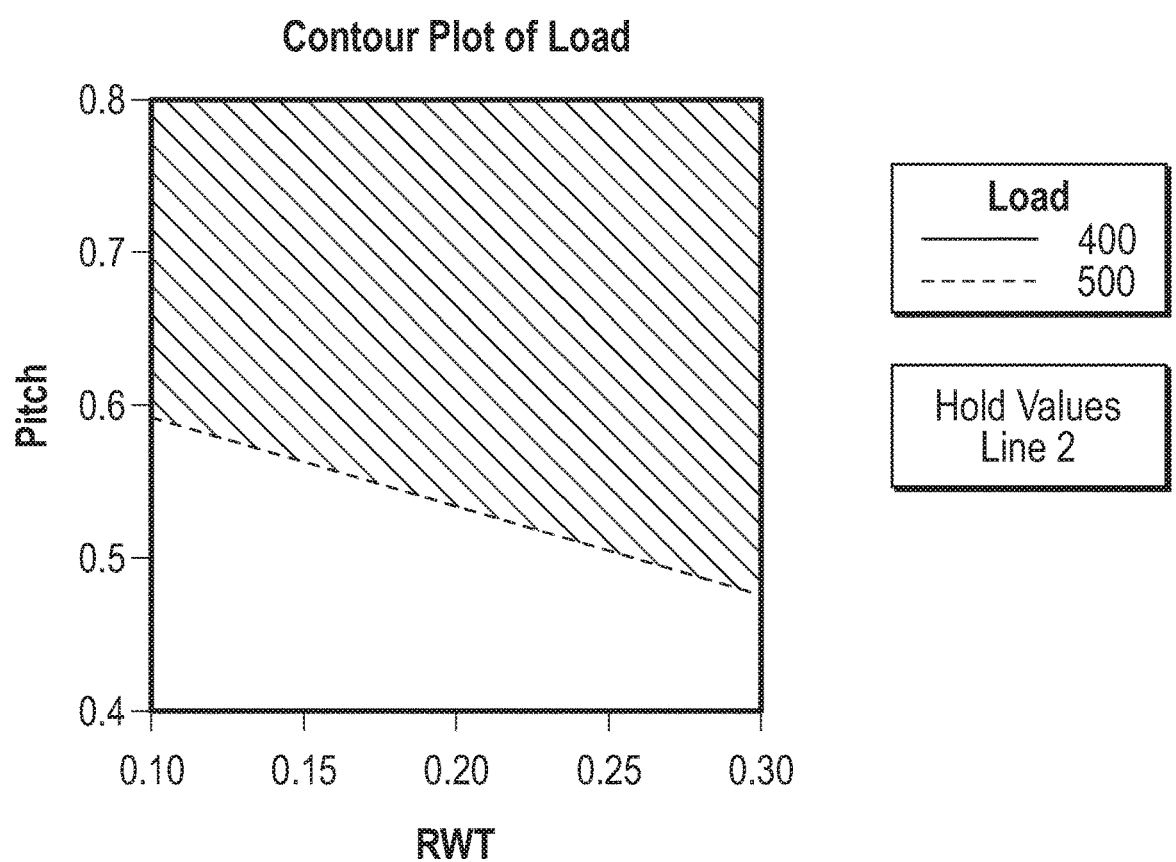
FIG. 8 illustrates a contour plot of tensile load versus pitch of a score line of a tear seam with respect to remaining wall thickness (rwt) of a cover skin in accordance with an exemplary embodiment.
Figure 9:
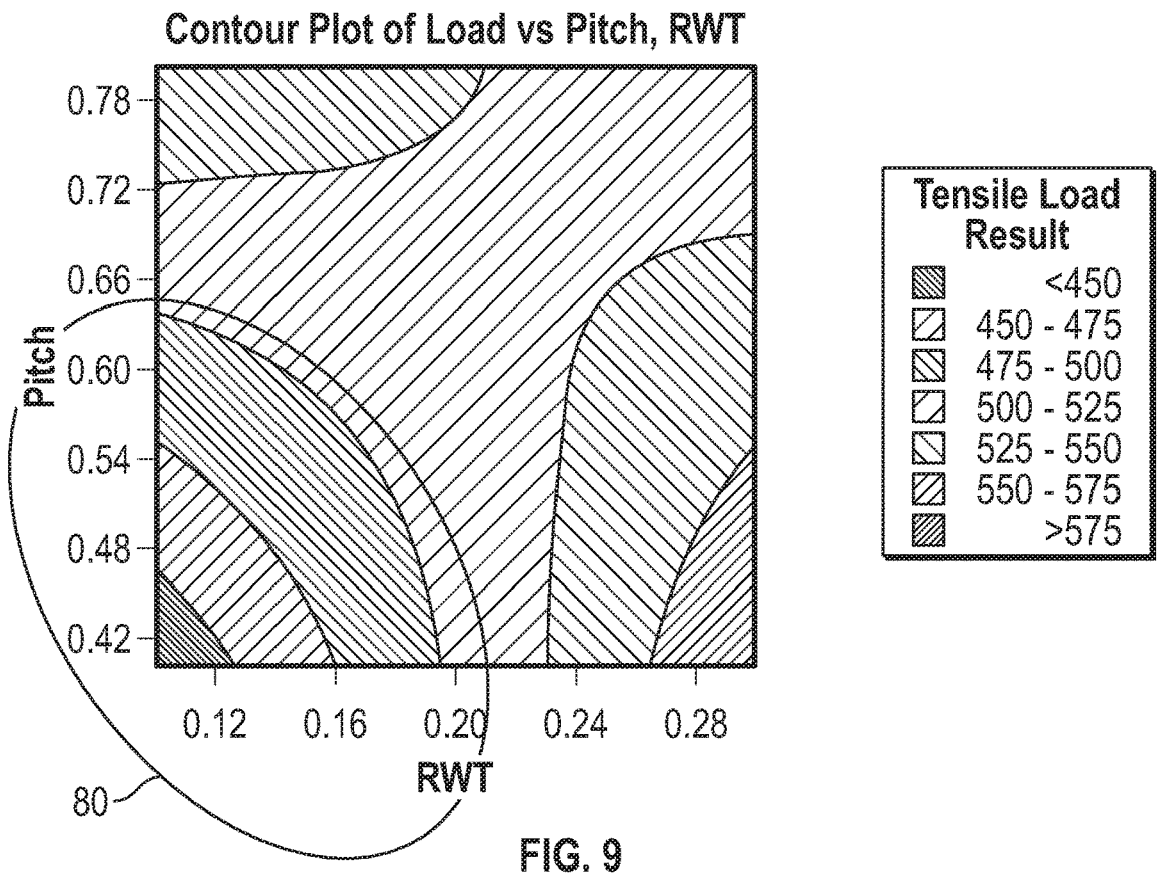
FIG. 9 illustrates a contour plot of tensile load versus pitch of a score line of a tear seam with respect to remaining wall thickness (rwt) of a cover skin in accordance with an exemplary embodiment.

FIG. 8 illustrates a contour plot of tensile load versus pitch of a score line of a tear seam with respect to remaining wall thickness (rwt) of a cover skin in accordance with an exemplary embodiment. FIG. 9 illustrates a contour plot of tensile load versus pitch of a score line of a tear seam with respect to remaining wall thickness (rwt) of a cover skin with a desired range (indicated by enclosed area 80) in accordance with an exemplary embodiment. Cover skin samples having tear seams with varying pitch from about 0.4 to about 0.6 mm and varying remaining wall thickness (rwt) from about 0.1 to about 0.3 mm, were prepared and tested to determine the tensile load required to tear the tear seams. During testing it was found that score lines were visible at about 0.15 mm rwt and a pitch of about 0.5 mm. Additionally, it was found that rwt was the most significant factor in visibility followed by pitch, with the most preferred results (e.g., substantially or fully invisible score line) of about 0.25 mm rwt and a pitch of about 0.4 mm.

Figure 10:
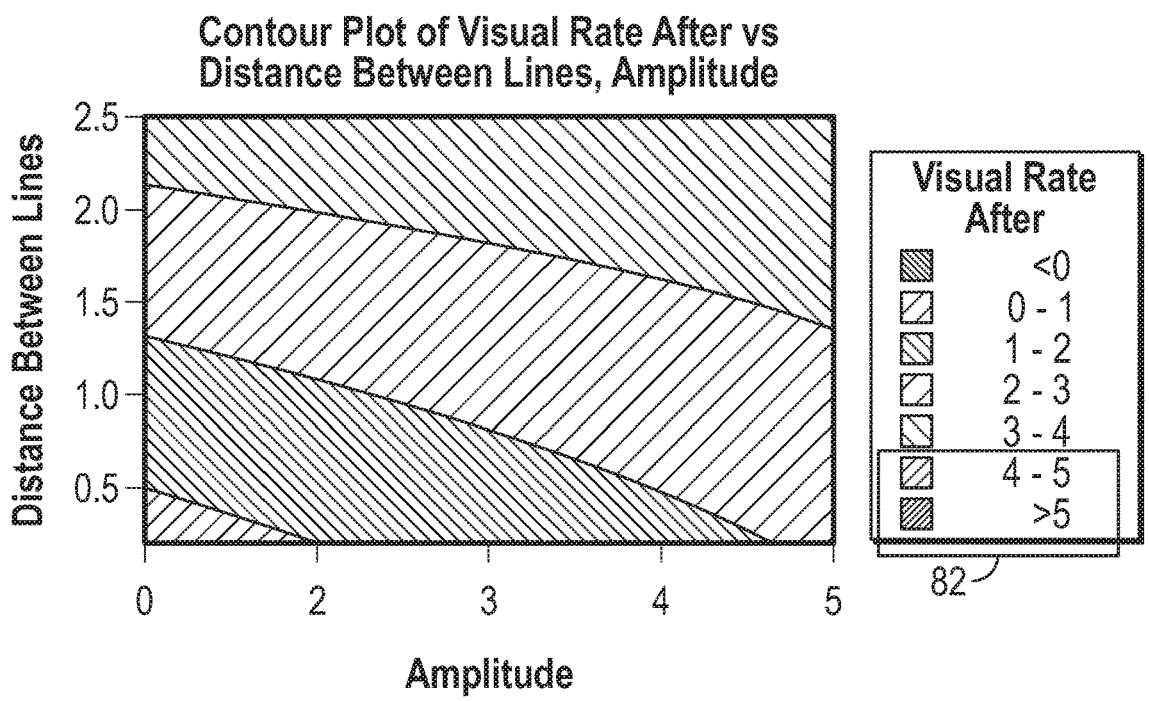
FIG. 10 illustrates a contour plot of visual rate versus distance between score lines with respect to amplitude in accordance with an exemplary embodiment.
Figure 11:
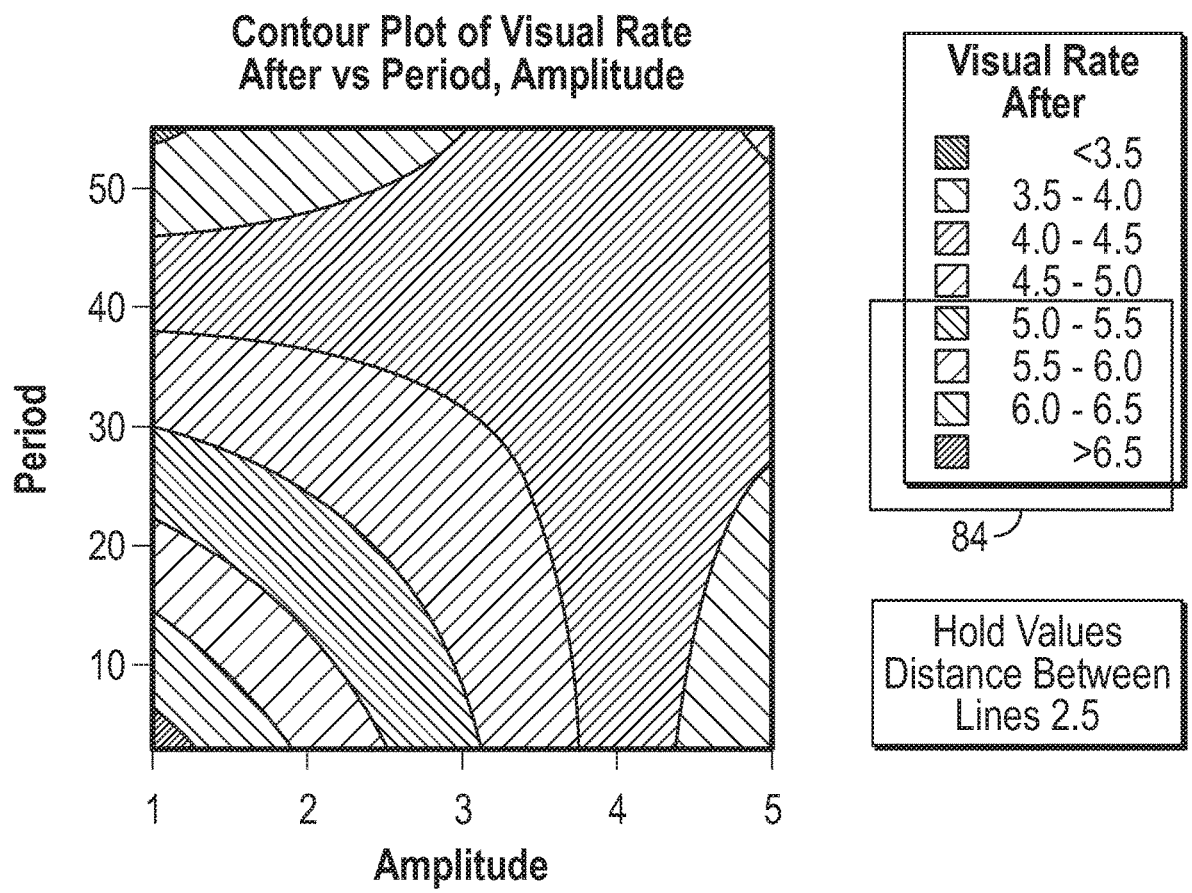
FIG. 11 illustrates a contour plot of visual rate versus period with respect to amplitude in accordance with an exemplary embodiment.

FIG. 10 illustrates a contour plot of visual rate versus distance between score lines with respect to amplitude in accordance with an exemplary embodiment. FIG. 11 illustrates a contour plot of visual rate versus period with respect to amplitude in accordance with an exemplary embodiment. The "visual rate after" indicated visual levels of score lines in which higher values are less visible with the desired values being substantially or fully invisible with the respective desired ranges for FIGS. 10-11 (indicated by enclosed areas 82 and 84). Cover skin samples having tear seams with varying distance between score lines versus amplitude, and period versus amplitude were prepared and visually inspected. Results indicated that a score line spacing of about 2.5 mm between score lines is most preferred for non-visibility.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel for a motor vehicle, the interior panel comprising:
   a substrate; and
   a cover skin overlying the substrate and having a tear seam configured as a double wave pattern including a first score line wave pattern and a second score line wave pattern that are substantially in phase and each having an amplitude of from about 1.3 to about 1.7 mm and a period of from about 8 to about 10 mm, wherein the first and second score line wave patterns are spaced apart from each other a distance of from about 2.3 to about 2.7 mm.

2. The interior panel of claim 1, wherein the first and second score line wave patterns are configured as substantially in phase sine wave patterns.

3. The interior panel of claim 1, wherein the amplitude of each of the first score line wave pattern and the second score line wave pattern is about 1.5 mm.

4. The interior panel of claim 1, wherein the period of each of the first score line wave pattern and the second score line wave pattern is about 9 mm.

5. The interior panel of claim 1, wherein the cover skin has an inner surface facing towards the substrate and an outer surface opposite the inner surface for facing an interior of the motor vehicle, and wherein the first and second score line wave patterns are formed through the inner surface extending towards the outer surface of the cover skin.

6. The interior panel of claim 5, wherein the first score line wave pattern is defined by successively arranged and spaced apart first holes formed through the inner surface extending towards the outer surface of the cover skin, and the second score line wave pattern is defined by successively arranged and spaced apart second holes formed through the inner surface extending towards the outer surface of the cover skin.

7. The interior panel of claim 6, wherein the first holes have a pitch defined by a distance between centers of adjacent holes of from about 0.35 to about 0.45 mm.

8. The interior panel of claim 6, wherein the second holes have a pitch defined by a distance between centers of adjacent holes of from about 0.35 to about 0.45 mm.

9. The interior panel of claim 5, wherein the first and second score line wave patterns are defined by negative features extending through the inner surface towards the outer surface with a remaining wall thickness (rwt) of the cover skin of from about 0.18 to about 0.32 mm.

10. The interior panel of claim 1, wherein the cover skin comprises one of leather, imitation leather, and artificially grown leather.

11. The interior panel of claim 1, further comprising an intermediate layer disposed between the substrate and the cover skin, wherein the intermediate layer comprises one of a foam material and a self-tearing spacer fabric.

12. A method of making an interior panel for a motor vehicle, the method comprising the steps of:

forming a tear seam in a cover skin, the tear seam including a double wave pattern that pre-weakens the cover skin, wherein the double wave pattern includes a first score line wave pattern and a second score line wave pattern that are substantially in phase and each having an amplitude of from about 1.3 to about 1.7 mm and a period of from about 8 to about 10 mm, wherein the first and second score line wave patterns are spaced apart from each other a distance of from about 2.3 to about 2.7 mm; and arranging the cover skin overlying a substrate.

13. The method of claim 12, wherein forming the tear seam comprises forming the tear seam by one of a laser scoring process, a milling process, a perforation process, and an artificially grown leather process to define the first and second score line wave patterns.

14. The method of claim 12, wherein the cover skin comprises one of leather, imitation leather, and artificially grown leather, and wherein the method further comprises the step of:

tanning the cover skin after forming the tear seam in the cover skin.

\* \* \* \* \*